United States Patent [19]

Kita et al.

[11] Patent Number: 4,606,896
[45] Date of Patent: Aug. 19, 1986

[54] APPARATUS FOR SUPPLYING A CONTROLLED FLOW OF GAS TO A FLUIDIZED GRID

[75] Inventors: Jean C. Kita, Vermelles; Roger M. Puff, Lens, both of France

[73] Assignee: Charbonnages de France, Paris, France

[21] Appl. No.: 697,940

[22] Filed: Feb. 4, 1985

[30] Foreign Application Priority Data

Feb. 7, 1984 [FR] France ................... 84 01861

[51] Int. Cl.$^4$ ............................................. F12B 15/10
[52] U.S. Cl. ........................................ 432/58; 432/15; 110/245; 34/57 A; 431/170
[58] Field of Search ............... 110/245; 432/58, 15; 34/57 A, 57 B; 431/170

[56] References Cited

U.S. PATENT DOCUMENTS

| | | | |
|---|---|---|---|
| 3,792,816 | 2/1974 | Evans . | |
| 3,880,554 | 4/1975 | Termansen et al. . | |
| 4,017,253 | 4/1977 | Wielang et al. | 432/58 |
| 4,308,806 | 1/1982 | Uemura et al. | 110/245 |
| 4,311,278 | 1/1982 | Sutton | 432/58 |
| 4,315,469 | 2/1982 | Vareide et al. | 432/58 |
| 4,338,079 | 7/1982 | Faulkner et al. . | |
| 4,341,515 | 7/1982 | Korenberg | 110/245 |
| 4,345,894 | 8/1982 | Smith et al. | 110/245 |
| 4,455,969 | 6/1984 | Barken | 110/245 |
| 4,460,330 | 7/1984 | Asai et al. | 110/263 |

FOREIGN PATENT DOCUMENTS 8300013  1/1983  PCT Int'l Appl. .
2118454 11/1983 United Kingdom .

Primary Examiner—Henry C. Yuen
Attorney, Agent, or Firm—Cushman, Darby & Cushman

[57] ABSTRACT

Apparatus for supplying gas to a fluidization grid which has two separate supply circuits, one for compressed air and one for fluidizing air, the orifices of each circuit ending at the pyramids of the grid. The orifices of each circuit, are arranged in groups, and are connected by pipes to a stator cylinder in which a rotatable rotor tube extends. A motor is arranged to rotate the rotor tube to a number of predetermined positions. The rotor tube is connected to a supply pipework and is pierced with passage openings which are arranged upon rotation of the rotor tube to correspond to the pipes.

3 Claims, 3 Drawing Figures

APPARATUS FOR SUPPLYING A CONTROLLED FLOW OF GAS TO A FLUIDIZED GRID

BACKGROUND TO THE INVENTION

The invention relates to apparatus for supplying gas to a fluidisation grid having at least two separate circuits, each having multiple outlet orifices.

A grid of this type can be employed, for example, in a combustion hearth for a granular fuel of the type described in French Pat. No. FR-A-82/00,815. In this grid, a first circuit for injecting air, which is fluidising air, ends in a large number of orifices situated in a first plane of the grid, and a second circuit for injecting air ends in a large number of orifices situated preferably in a second plane of the grid, placed at a level above the level of the first plane. For example, the orifices of the second circuit are at different levels relative to pyramidal frusta which stand alternately starting at the surface of the grid.

The advantage of such a grid is that it makes it possible to regulate the rate of combustion and the hearth power over a wide range by adjustment of the flow of air through each circuit. It is desirable to control the respective flow in each circuit and, also, to control the flow injected through some orifices in relation to other orifices belonging to the same circuit, and thus heretofore a large number of flow-control diaphragms and valves have had to be employed, the management of which becomes a real problem.

SUMMARY OF THE INVENTION

It is an object of the invention to provide apparatus which greatly facilitates the control of air injection through different orifices of each circuit and, thus, the overall flow control of air supplied to the grid.

According to the present invention, the orifices of each of the circuits are combined in groups of several orifices (for example five orifices), and each group is supplied with gas by means of a flow-control manifold comprising an elongate stator body connected to the orifices at spaced points, and an elongate movable body is arranged within the stator body and is arranged to be movable between several predetermined positions, each of which corresponds to a respective control setting for the rate of supply or non-supply of gas to each of the orifices.

In an embodiment of the invention, the elongate stator body is a cylinder connected at spaced points in its lengthwise direction along a determined line, respectively to each of the orifices, by means of corresponding tubes having a determined bore. The movable body for flow control is a tube supported concentrically inside the stator cylinder so as to be rotatable in the latter. The rotor tube is connected at one end to an air inlet manifold, is coupled at its opposite end to a rotary drive motor, and has several determined lengthwise lines spaced in a circumferential direction, whose number is greater by one than the number of orifices forming a group. These lengthwise lines correspond to as many determined positions as can be assigned to the rotor tube inside the stator cylinder by the drive motor to place each of these lengthwise lines, as required, to correspond with the determined line along which are located the tubes connecting the stator cylinder to the orifices.

Each lengthwise line is used for controlling the air flow, for example from a zero value at all the orifices to a maximum value at all the orifices, passing through the gradual supply to a first orifice, then to a second orifice, then to a third, and so on. To this end, air passage openings are provided at requisite locations in the lengthwise lines, which are determined so as to be capable of being placed opposite the connecting tubes; these passage openings preferably have a cross-section which is smaller than that of the connecting pipes.

In a grid which has two separate air injection circuits, the orifices of each circuit are distributed in groups and each group is connected to a flow control manifold as explained earlier. In a case where one or more other separate circuits existed, the orifices of each of these could be grouped and connected as just described, to a corresponding control manifold, the invention not being restricted in any way to two circuits.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
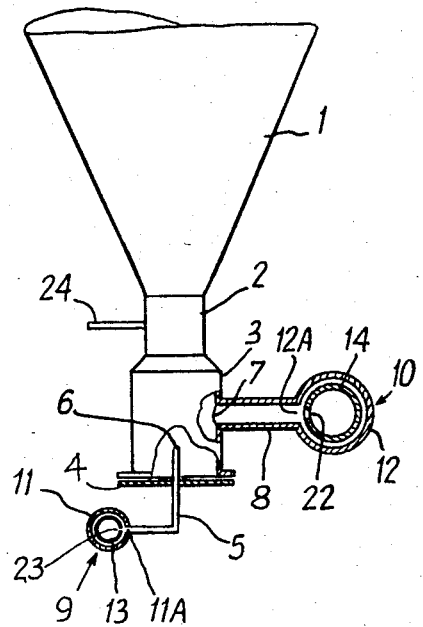
FIG. 1 shows an elevation, partly in cross-section, of part of a grid with two air circuits supplied with air by devices of the invention.

The present invention is described herein as applied to a fluidisation grid for combustion of granular coal. The grid comprising a large number of inverted pyramids 1 arranged side by side and each supplied with fluidising air and with compressed air via two separate circuits. The number of pyramids in the grid can be high; for example of the order of 80 for a boiler with a vaporisation capacity of 50 t/h, or 100 for a boiler with a vaporisation capacity of 80 t/h.

At the bottom part of each pyramid 1 there is an end piece 2 connected to a blowing chamber 3 which is closed by a removable base 4. An axially extending pipe 5 passes through the centre of the base 4 towards the pyramid 1. The pipe 5 ends in the chamber 3 in an orifice 6 from which compressed air is emitted. In the side of the same chamber 3 there opens, via a side orifice 7, a pipe 8 through which fluidising air is injected. The compressed air is used to deblock or to free the pyramids 1. If there is a blockage or if the combustion slows down. After each pyramid has been cleared by the compressed air, fluidising air is fed to it and the flow of compressed air is stopped.

The above is only given by way of example. The invention is independent of the type of grid, of the number of air circuits associated with the grid and also of the precise function of each circuit.

The orifices 6 of one circuit and the orifices 7 of another circuit and respectively combined into groups of several units, five in this example, and each of these groups is connected to a respective manifold 9, 10 for flow control. Each of the manifolds 9, 10 comprises a respective stator cylinder 11, 12 to which is connected at separate points along a respective generating line 11A to 11E, 12A to 12E respective pipes 5 or 8. A respective rotor tube 13, 14 is concentrically mounted inside each stator cylinder 11, 12 and is rotatable with respect thereto. At one end, each rotor tube is coupled to the shaft of a respective motor 15, 16, for rotation therewith. At the opposite end each rotor tube 13, 14 if coupled to a respective supply pipe. Thus, a pipe 17 for compressed air is connected to the rotor tube 13, and a pipe 18 for fluidising air is connected to the rotor tube 14. A respective stop valve 19, 20, and, if appropriate, a diaphragm 21, is fitted between each supply pipe 17, 18 and the corresponding rotor tube 13, 14. Seals (not shown) are fitted at both ends of the stator cylinders 11, 12 to make them leakproof without interfering with the rotation of the rotor tubes 13, 14 or with the supply thereto of compressed or fluidising air.

Opposite each of the connecting points 11A to 11E, 12A to 12E of the respective pipe 5, 8 with the stator cylinder 11, 12, the corresponding rotor tube 13, 14 has a circular line on which appropriate means are provided for ensuring, as required, a supply of compressed or fluidising air routed to each pyramid 1 of the group, depending upon the operating conditions.

Figure 3:
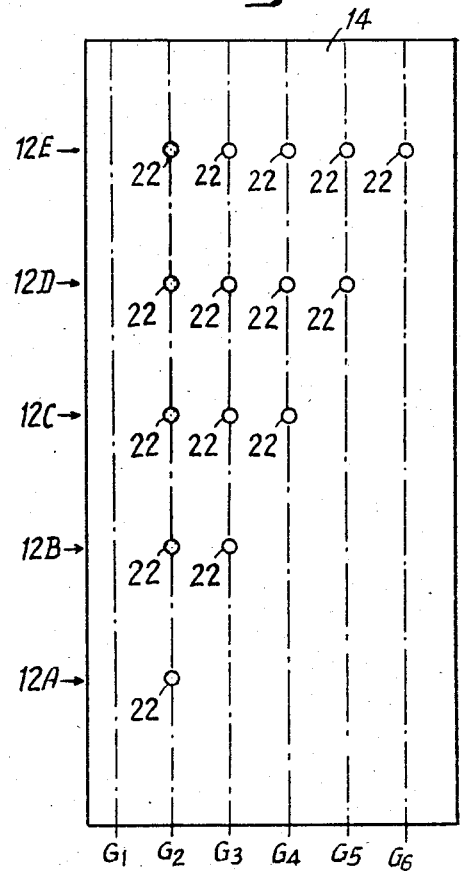
FIG. 3 shows a rotor tube opened out to show its air passage openings.
Figure 2:
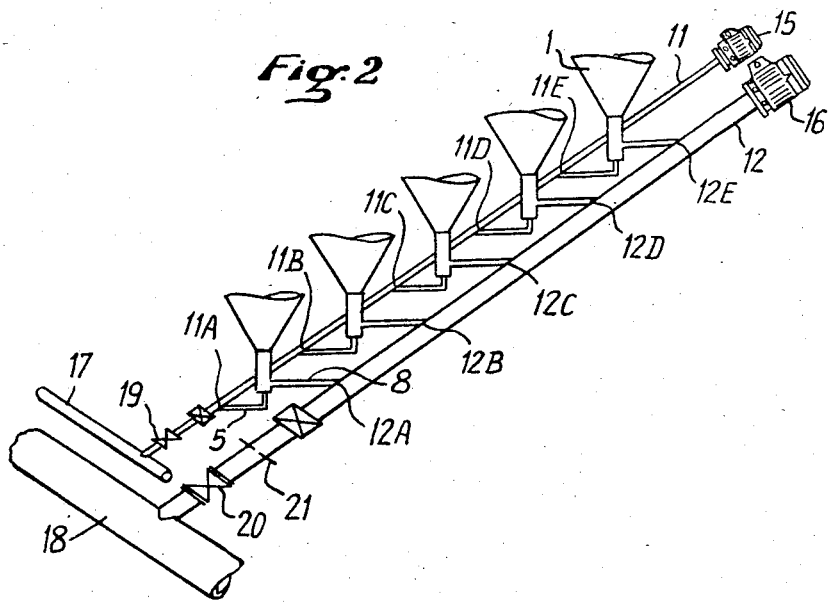
FIG. 2 shows a perspective view of two groups of orifices supplied with air by the devices of FIG. 1.

FIG. 3 shows the development on a plane surface of the rotor tube 14 slit along a generating line.

Generating lines bearing references $G_1$ to $G_6$, which are spaced at 60° from each other are shown as dot-and-dash lines.

Generating line $G_1$ has no air passage opening; there are five air passage openings 22 on generating line $G_2$, four openings 22 on generating line $G_3$, three openings 22 on generating line $G_4$, two openings 22 on generating line $G_5$ and one opening 22 on generating line $G_6$. These openings 22 are situated to correspond with the connecting points 12A to 12E. The openings 22 are identical and each has a cross-section which is smaller than the cross-section of the connecting pipes 8, so that they act as a control diaphragm in relation to the latter. Advantageously, the stator cylinder 11, 12 and the rotor tube 13, 14 are concentric, with a small clearance in radial direction.

When the rotor tube 14 has been rotated by way of the motor 16, so that generating line $G_1$ faces pipes 8, the supply of fluidising air is stopped. By moving generating lines $G_2$ to $G_6$ in the same manner, five pyramids 1, or only four, or three, or two or only one, are supplied at will.

The rotor tube 13 also has passage openings 23 which can be placed at will facing the connecting pipes 5, but these openings 23 are not arranged in accordance with the same diagram because the compressed air requirements are different. There are six generating lines one of which has no opening, to stop the supply; each of the other five generating lines has only one opening 23, and these openings are offset by the distance separating pyramids 1 from one generating line to the next; compressed air can thus be supplied to only one pyramid 1 at a time; these pyramids are supplied so that they can be deblocked in succession. As soon as a pyramid is deblocked, it is supplied with fluidising air and this supply of fluidising air to the deblocked pyramids is then maintained.

Of course, the arrangement of the air passage openings can be altered depending upon the use to which the invention is to be put. It will be noted that, in order to control the air flows with a device of the invention, the number of the generating lines and of the determined positions of the rotor tube 13, 14 within its stator cylinder 11, 12 is greater by one than the number of orifices which are combined in a group. The choice of a generating line which is a straight line, for providing the passage openings 22 therein, is not essential; the openings could be arranged in lines which are not straight lines, for example helical, provided that the openings can be placed at the required locations during operation.

In the embodiment described above, the pyramids 1 also have a pipe 24 which opens into the end part 2, for injecting a gas or water into the hearth. The supply to these pipes 24 could also be controlled by means of a device of the invention. The relative arrangement of the devices around a grid depends on the grid itself. Where the grid is square or rectangular the flow-control manifolds may be arranged in parallel; in the case of a circular grid, it is preferable to arrange them radically.

We claim:

1. Apparatus for supplying a gas to a gas circuit of the type having at least two spaced apart input orifices, the gas being supplied from a supply means, comprising:
   an elongated hollow stator member having a predetermined length and connected at spaced points to said input orifices of said circuit,
   an elongated hollow body disposed within said stator member and having a longitudinal axis, said body being movable in a circumferential direction about said axis relative to said stator member between a number of predetermined positions, said body having a surface having apertures therein arrayed so that, in at least one of said positions, no apertures register with any of said input orifices, in another of said positions, at least one of said apertures registers with one of said orifices and, in still another of said positions, each of said input orifices is in registry with one of said apertures, said body being in flow communication with said supply means;
   each input orifice being associated with another input orifice thereby forming a group comprising a pair, each said another input orifice being in flow communication with another elongated hollow stator member having a predetermined length and another elongated hollow body being disposed within said another stator member and having a longitudinal axis, said another body being movable in a circumferential direction about said axis relative to said another stator member between a number of predetermined positions, said another body having a surface having apertures therein arrayed so that, in at least one of said positions, no apertures register with any of said another input orifices and, in another of said positions, at least one of said apertures registers with at least one of said another input orifices, said another body being in flow communication with a separate supply means; said apparatus including a combustion grid means for fluidized granular material, said input orifices being for fluidizing gas and said another input orifices being for compressed gas.

2. The apparatus as claimed in claim 1 wherein said body is a rotatable tube connected at one end thereof to a motor means for imparting rotation thereto, said tube being connected at its other end to said supply means, said tube having sealing means adjacent each said end.

3. The apparatus as claimed in claim 1, wherein said stator member is a cylinder and said body is a tube and a slight clearance is provided between said tube and cylinder, said aperatures have an area that is smaller than said input orifice.

* * * * *